United States Patent [19]
Venable

[11] Patent Number: 5,643,399
[45] Date of Patent: Jul. 1, 1997

[54] COMPOSITE ROOFING PRODUCT AND APPARATUS AND METHOD FOR CLEANING VULCANIZED RUBBER AND FOR MAKING A COMPOSITE ROOFING PRODUCT

[75] Inventor: Jesse S. Venable, Herington, Kans.

[73] Assignee: Carlisle Corporation, Syracuse, N.Y.

[21] Appl. No.: 391,417

[22] Filed: Feb. 16, 1995

Related U.S. Application Data

[63] Continuation-in-part of Ser. No. 243,703, May 17, 1994, Pat. No. 5,456,785.

[51] Int. Cl.$^6$ ................................................. B32B 31/04
[52] U.S. Cl. .................... 156/494; 156/499; 156/555; 156/583.1; 15/77; 15/179
[58] Field of Search .............................. 156/502, 527, 156/554, 574, 579, 509, 536, 494, 499, 555, 583.1; 15/77, 179, 181

[56] References Cited

U.S. PATENT DOCUMENTS

| | | | |
|---|---|---|---|
| 1,701,639 | 2/1929 | Schulz | 15/77 |
| 2,644,779 | 7/1953 | Manning | 156/496 X |
| 2,778,088 | 1/1957 | Sterrett | 25/154 |
| 2,923,109 | 2/1960 | Pelley | 51/282 |
| 2,952,100 | 12/1960 | Pelley | 51/14 |
| 3,252,257 | 5/1966 | Price et al. | 52/518 |
| 3,823,047 | 7/1974 | Colombo | 156/555 X |
| 3,938,213 | 2/1976 | Di Fede | 15/77 |
| 3,967,032 | 6/1976 | Plotz et al. | 428/300 |
| 4,039,706 | 8/1977 | Tajima et al. | 428/40 |
| 4,055,453 | 10/1977 | Tajima et al. | 156/279 |
| 4,073,997 | 2/1978 | Richards et al. | 428/285 |
| 4,082,592 | 4/1978 | Raabe et al. | 156/502 X |
| 4,135,271 | 1/1979 | Harding et al. | 15/53.4 |
| 4,248,926 | 2/1981 | Tajima et al. | 428/253 |
| 4,404,243 | 9/1983 | Terpay | 428/62 |
| 4,724,186 | 2/1988 | Kelch | 428/344 |
| 4,855,172 | 8/1989 | Chiu | 428/57 |
| 4,920,720 | 5/1990 | LaBianca | 52/506 |
| 4,944,818 | 7/1990 | Dybsky et al. | 156/71 |
| 4,996,812 | 3/1991 | Venable | 52/408 |
| 5,052,162 | 10/1991 | Bush et al. | 52/518 |
| 5,108,155 | 4/1992 | Hettes | 300/21 |
| 5,206,068 | 4/1993 | Kalkanoglu | 428/143 |
| 5,256,228 | 10/1993 | Davis et al. | 156/157 |

FOREIGN PATENT DOCUMENTS

| | | |
|---|---|---|
| 2267220 | 2/1991 | France . |
| 4000560 | 7/1991 | Germany . |
| 0450143 | 10/1991 | Germany . |
| 0022334 | 7/1975 | Japan . |
| 9301852 | 3/1994 | United Kingdom . |

*Primary Examiner*—James Sells
*Attorney, Agent, or Firm*—Wood, Herron & Evans, L.L.P.

[57] ABSTRACT

An apparatus and method for making a composite roofing material includes a reel support for reels of each of a vulcanized rubber sheet, a polymeric film and a fleece matting and pinch rollers which advance the rubber sheet from its reel through a path including a cleaning and scrubbing vat, a stretcher, and a heater. In the cleaning and scrubbing vat, counter-rotating brush cylinders with special abrasive bristles effectively remove the non-stick talc coating from the vulcanized rubber. Once the rubber sheet is heated, polymer film and fleece matting from separate rollers are sandwiched with the rubber sheet and passed through a pair of compression pinch rollers where the polymeric film is melted. The melted film acts as an adhesive to cause the fleece matting to adhere to the vulcanized rubber sheet as the rubber sheet, the polymeric film and the fleece matting are compressed together by the compression pinch rollers to yield a composite sheet with selvedges left along one or both sides of the roofing material. The composite sheet is then flipped 180 degrees and a layer of a roof covering granules with a bonding agent is deposited across the width of the remaining side of the rubber sheet. The sheet is then reheated, melting the bonding agent particles and adhering the roof covering granules to the composite sheet.

9 Claims, 4 Drawing Sheets

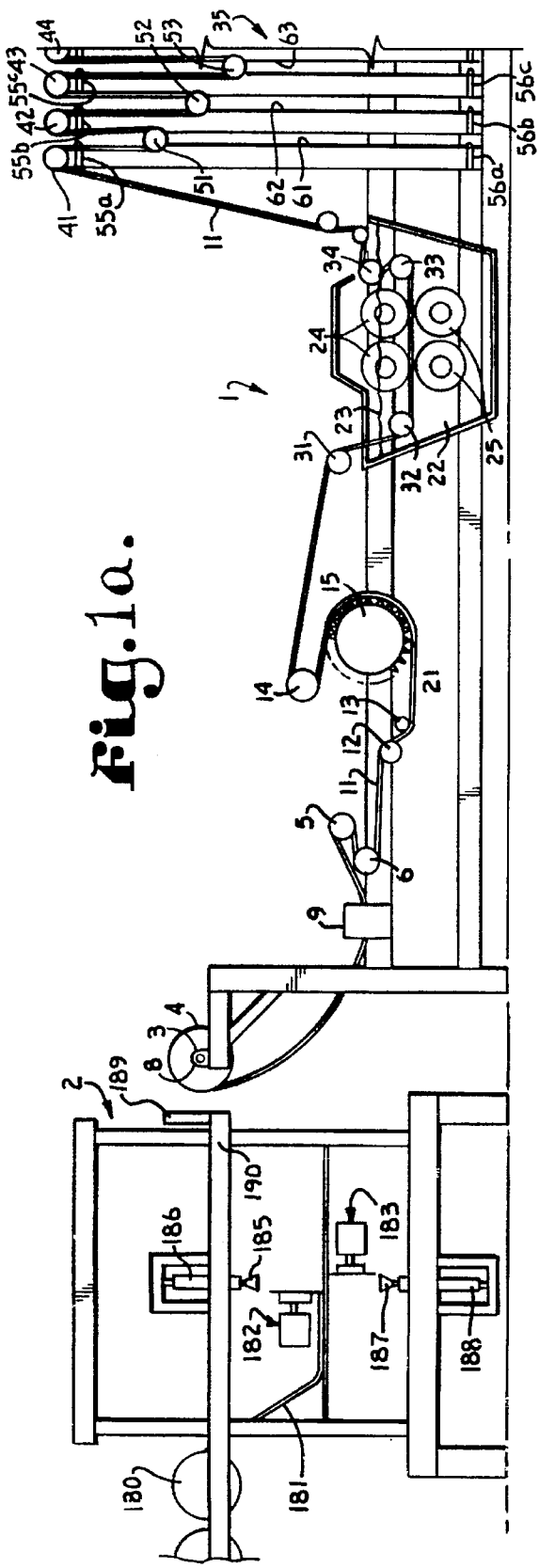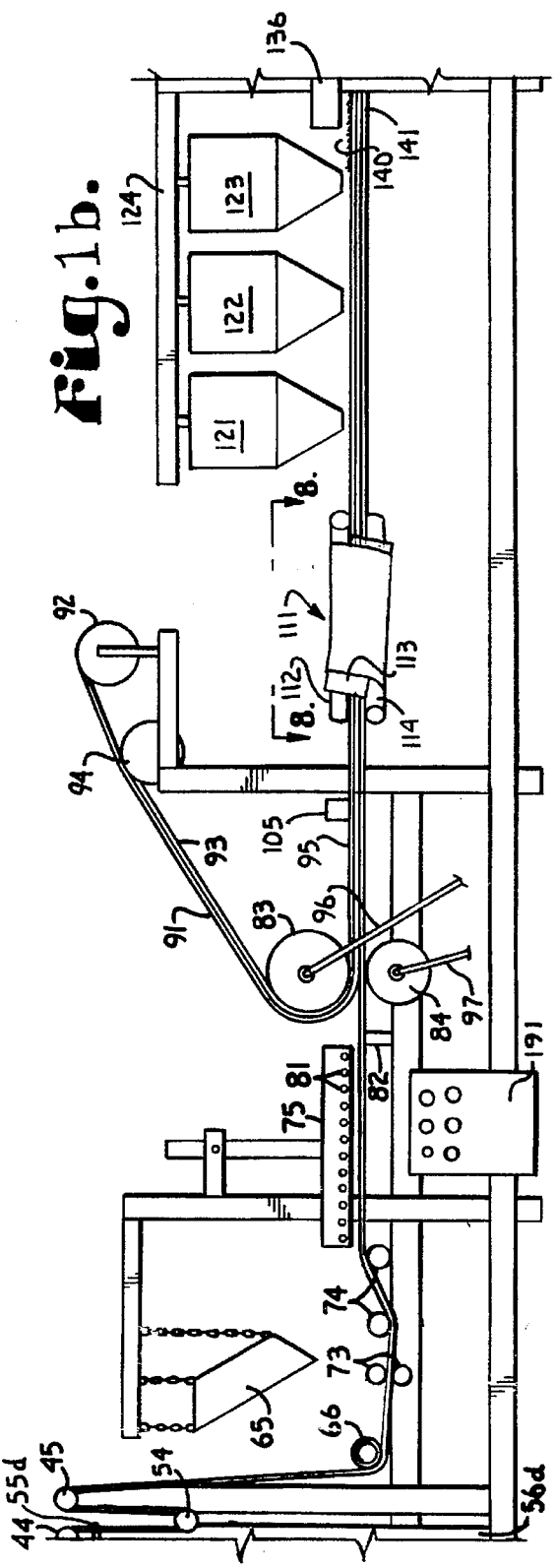

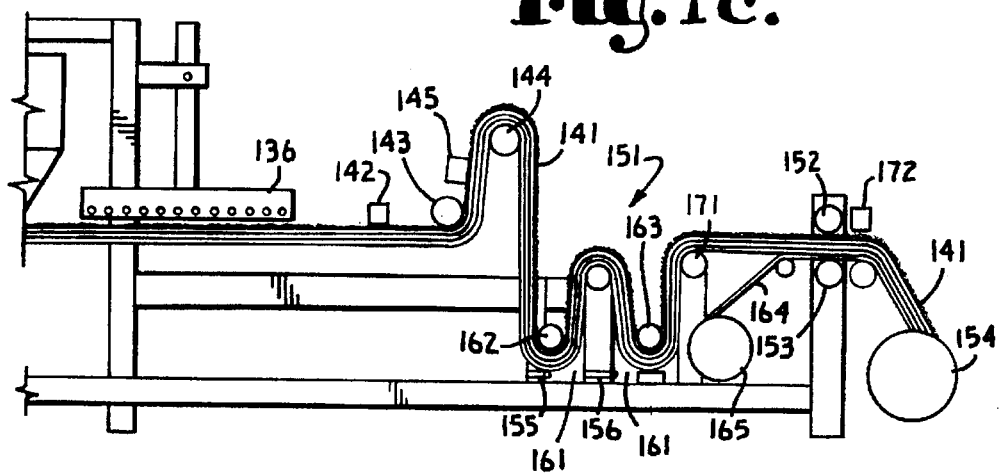
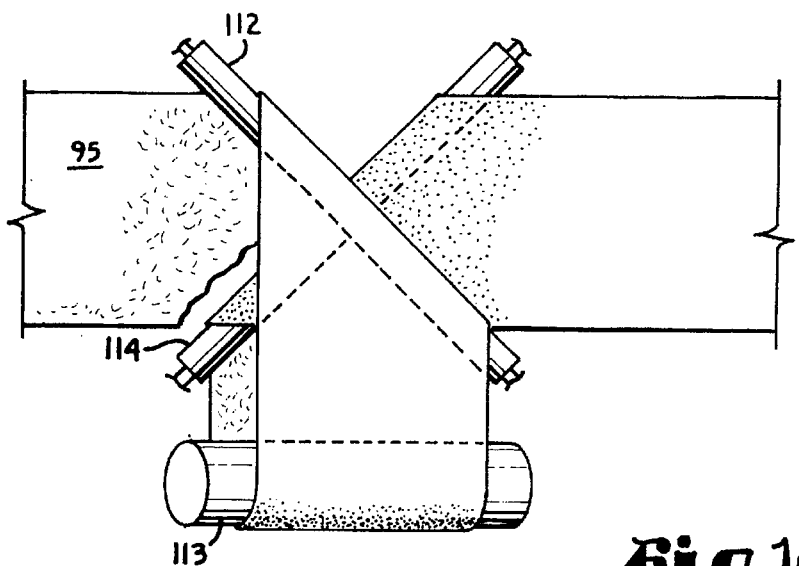
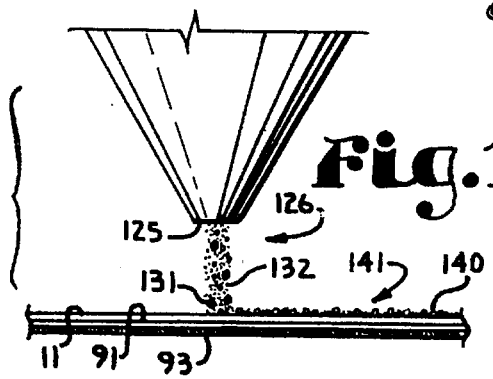
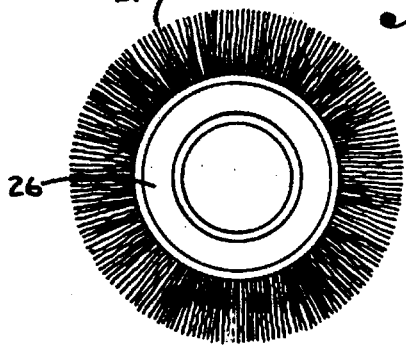
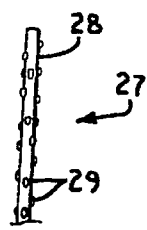

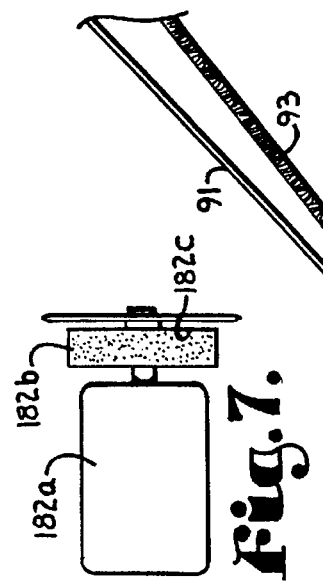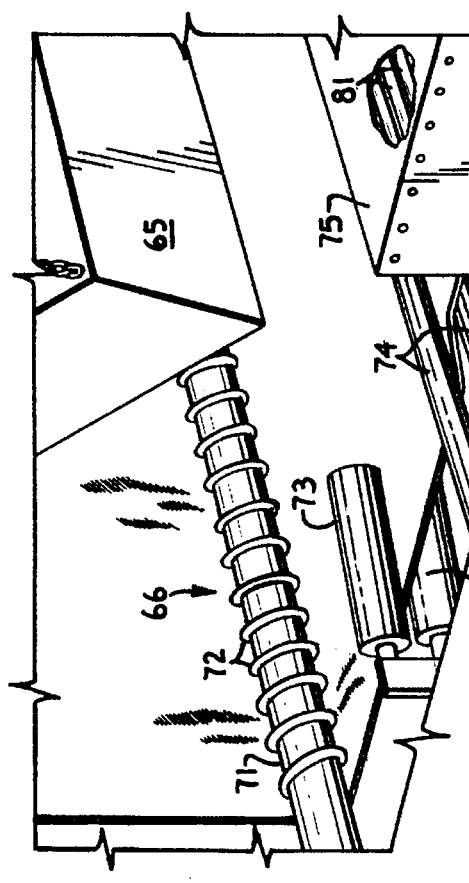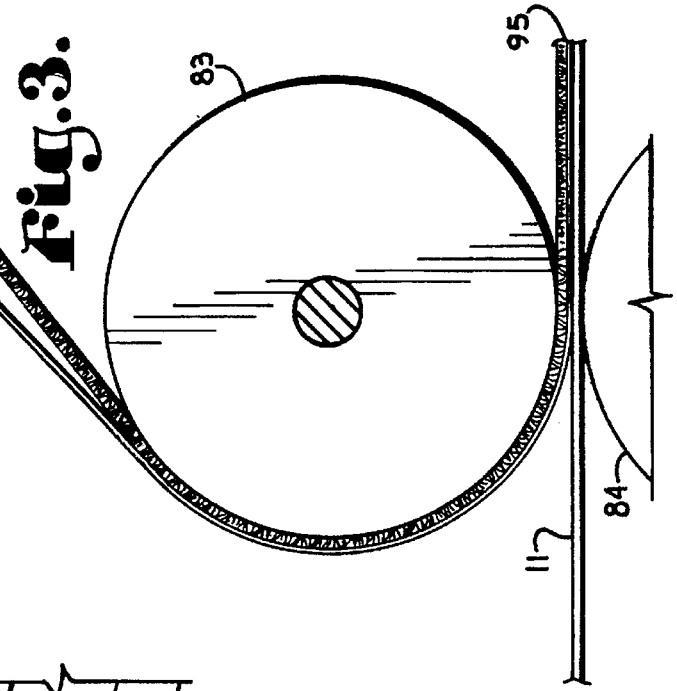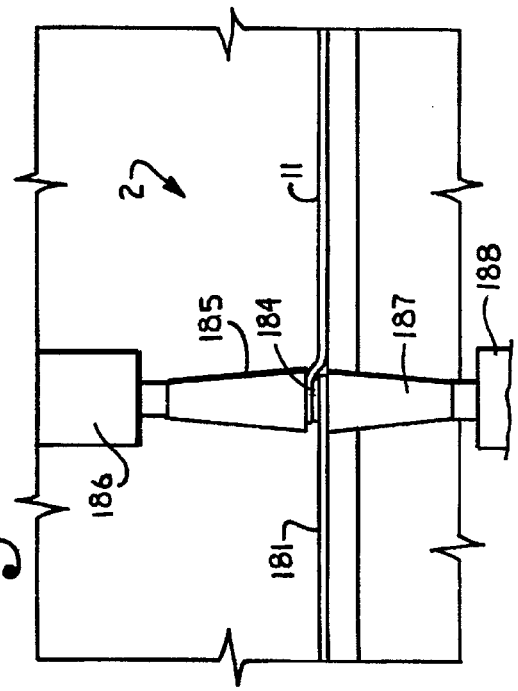

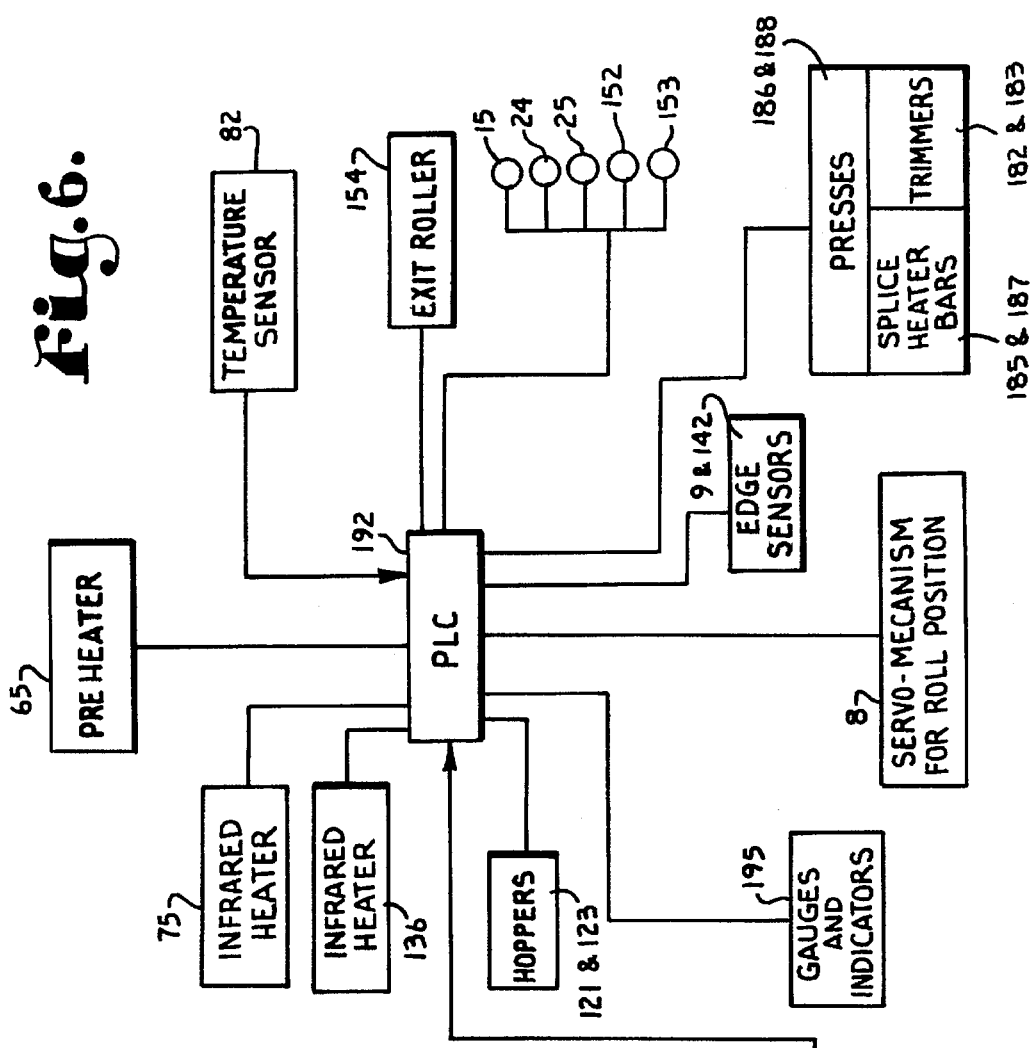
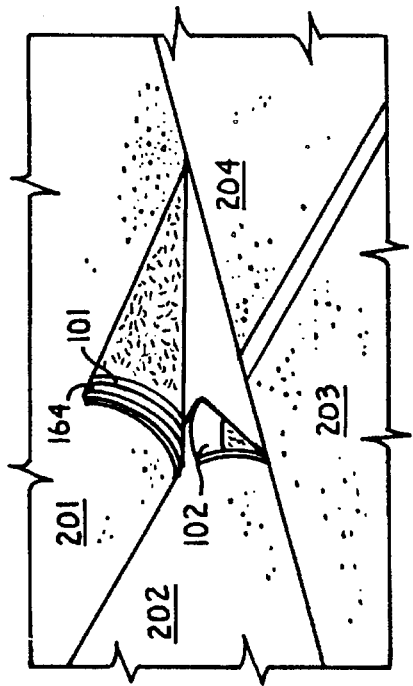
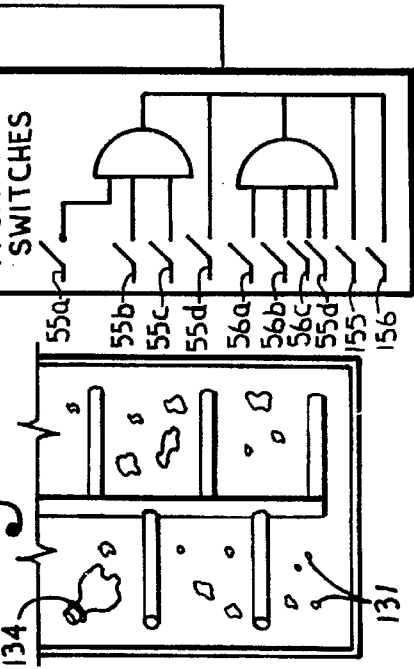

COMPOSITE ROOFING PRODUCT AND APPARATUS AND METHOD FOR CLEANING VULCANIZED RUBBER AND FOR MAKING A COMPOSITE ROOFING PRODUCT

CROSS REFERENCE TO RELATED APPLICATIONS

This application is a continuation-in-part of U.S. application for patent Ser. No. 08/243,703 for COMPOSITE ROOFING PRODUCT AND METHOD AND APPARATUS FOR MAKING A COMPOSITE ROOFING PRODUCT, filed May 17, 1994 U.S. Pat. No. 5,456,785.

BACKGROUND OF THE INVENTION

1. Field of the Invention

The present invention relates generally to a composite roofing product made up of a sheet of vulcanized rubber to one side of which is adhered a fleece matting via a polymeric film bonding agent and to the other side of which is adhered a layer of roof covering granules. An apparatus and method for cleaning vulcanized rubber and for making the composite roofing product is also disclosed.

2. Description of the Related Art

Sheet roofing products have been increasingly used in commercial building applications which involve large roof expanses, particularly with flat or shallow pitched roofs. This popularity of sheet roofing is due to a variety of factors, including convenience and speed of installation, reduced material and labor costs and longevity and reliability of the installed roof. Many sheet roofing products include synthetic rubber which are applied from rolls and attached to the roof via a variety of adhesives and fasteners.

While synthetic rubber sheets offer a number of advantages over competing products, including good weather resistance and elasticity, such rubber sheets, in and of themselves are not very resistant to puncture or stress cracking. Furthermore, rubber sheets, with their relatively smooth and moisture impervious surfaces, are resistant to bonding by most conventional adhesives, presenting a problem in reliably adhering the rubber sheets to the roof surface. Finally, where contiguous rolls of rubber sheets meet, they must overlap each other to form a weather impervious seal but these joints create a potential problem area where the overlapped rubber seams are adhered.

Previous attempts have been made to produce a composite roofing material including a synthetic rubber sheet with a fabric backing adhered thereto. One such roofing material is a membrane including a synthetic vulcanized rubber sheet having a thickness of from 40–70 mils backed by a polyester fleece-like matting having a thickness of about 40–80 mils which is produced by the Colonial Rubber Company of Dyersburg, Tenn. This product has proven to be very durable and crack and puncture resistant. In addition, the fleece-like matting provides an ideal bonding surface for roofing adhesives, such as the polyurethane foam adhesive taught in U.S. Pat. No. 4,996,812 (the '812 patent) to the present inventor, as well as asphalt and other adhesives.

Mass production of this composite material has proven to be problematical, however. In the known production method, the fleece-like matting is adhered to the rubber sheet during the vulcanization process, thus substantially complicating the vulcanization process and requiring very expensive, dedicated production machinery. At least partially as a result of the complexity of the process and equipment, material waste averages in excess of 30%. Since the membrane product is produced during the vulcanization process, the wasted material has virtually no other use. In addition, conventional vulcanization steam curing techniques cannot be used with the fleece lined material, thus requiring vulcanization time periods which are substantially increased over conventional vulcanized materials. Furthermore, it has proven impossible to produce a membrane with a selvedge on the underside of the membrane between the outside edge of the rubber sheet and the polyester matting. This is because, if such a selvedge is left, once the membrane is rolled into a roll for vulcanizing, the exposed selvedges will stick to adjacent layers in the roll, thus resulting in a congealed mass. Previous attempts to bond fleece matting to vulcanized rubber sheets have failed since no one has been able to reliably and effectively clean the talc or other non-stick coatings from the vulcanized rubber sheets. With the talc coatings intact on the rubber, conventional bonding agents will not work to bond the fleece matting to the rubber.

Furthermore, typical vulcanized rubber sheets are black in color, and with a fleece lining covering only the bottom surface of the rubber sheet, the exposed color of the roofing is black. However, many roofing applications, particularly in warmer climates, require white or light colored roofs for heat reflective properties, as well as aesthetics. While white colored rubber sheeting is available, it is considerably more costly than the typical black rubber. Furthermore, when exposed to weather and sunlight over a substantial period, white rubber is not very color stable.

It is clear then, that a need exists for an economical and reliable apparatus for producing a composite roofing material including a flexible vulcanized rubber sheet backed by a fleece-like matting. Such an apparatus should preferably use existing rolls of synthetic black vulcanized rubber (such as EPDM), which are available in commodity quantities, and should produce a roofing material which is durable and easy to apply to a roof surface. Such an apparatus must be capable of reliably and efficiently cleaning the talc or other non-stick coatings from the surfaces of the vulcanized EPDM rubber so that conventional bonding agents will adhere a fleece matting to the rubber. The roofing material thus produced should preferably include a selvedge on each side of the material underside between the edge of the rubber sheet and the matting for facilitating the attachment of sealing tape or adhesive between adjacent sheets as they are applied to a roof surface. Furthermore, the apparatus and method for producing the composite roofing material should preferably also be capable of producing a roofing material whose exposed upper side is white or otherwise lightly colored. Finally, the apparatus and method should be relatively economical to make and to run, and should be capable of efficiently producing large quantities of finished roofing material with minimal waste.

SUMMARY OF THE INVENTION

In the practice of the present invention, a continuous sheet of vulcanized rubber is thoroughly cleaned of all talc and other non-stick coatings. The cleaned, vulcanized sheet is adhered to a fabric or fleece matting on one side via a polymeric film which acts as an adhesive. The other side of the vulcanized sheet has adhered thereto a coating of roof covering granules, preferably of white or a light color. The coating of granules, which can be sand or ceramic beads, for example, is adhered to the rubber via a bonding agent, such as polyethylene, with which the granules can be coated or which are mixed with the granules as a particulate. In either instance, the polyethylene is then melted to form an adhesive.

An apparatus for making the composite roofing product feeds a continuous sheet of vulcanized rubber sheeting from a roll and through a cleaning vat which has specialized counter-rotating cylindrical brushes for scrubbing and cleaning the talc or other non-stick coatings from the vulcanized rubber sheet. Each brush includes bristles made of nylon with imbedded abrasive particles of silica or the like. The cleaned rubber sheet is then advanced through an accumulator and, upon leaving the accumulator, through a preheat and stretching apparatus. Next the stretched rubber sheet is passed through a first infrared heater where its surface temperature is raised to a range of 330 to 350 degrees Fahrenheit. Then a thin polymeric film, such as polyethylene, is sandwiched between the rubber sheet and a fleece matting with the residual heat from the rubber sheet melting the polymeric film. The vulcanized sheet, the polymeric sheet and the fleece matting are then compressed together via a pair of compression rollers to yield a composite roofing sheet. The composite sheet is then passed through a flipping roller assembly where the sheet is flipped 180 degrees. A mixture of light colored roof covering granules, such as sand or ceramic beads and a bonding agent, such as polyethylene or another plastic, is then distributed over the remaining side of the rubber sheet from one or more distributing hoppers. The polyethylene can be a particulate which is mixed with the covering granules, or the roof covering granules can be pre-coated with a polyethylene coating prior to being introduced into the distributing hoppers, which themselves can be heated. The composite sheet, with the granular coating thereon, is then passed through a second heater where the polyethylene particles, or the polyethylene coating on the covering granules, are melted, this causing the roof covering granules to bond to the rubber. The composite material is then cooled and rolled into rolls of finished roofing product.

The matting and polymeric film, as well as the coating of roof covering granules, are preferably each somewhat narrower than the rubber sheet, thus leaving an exposed selvedge of rubber along one or both longitudinal edges of the underside and the topside of the roofing material. A strip of double sided tape and/or primer is optionally applied to one or both of these selvedges as the composite material is cooling to provide a convenient way for adjacent sheets of roofing to be attached to each other.

A splicing table is positioned ahead of the apparatus to splice together rolls of vulcanized rubber end to end. The splicing table includes a pair of combination cutting and abrading wheels which both cut and abrade the ends of both rolls in preparation for splicing. A layer of double-sided splicing tape is then positioned between the abraded ends and a pair of heating bars are applied to the splice joint. In this fashion, spliced rolls of vulcanized rubber can be continuously spliced "on the fly" and fed through the apparatus without the need to rethread each roll of vulcanized rubber through the apparatus.

OBJECTS AND ADVANTAGES OF THE PRESENT INVENTION

The objects and advantages of the present invention include: providing a composite roofing material which includes a vulcanized rubber sheet to which are adhered, on one side, a fleece-like matting, and to the other side of which is adhered a layer of roof covering granules; providing such a material in which a selvedge of exposed rubber is left along each longitudinal edge of the underside of the material; providing such a material in which a strip of double sided splicing tape is optionally attached to one or both selvedges of the material; providing an apparatus for making such a composite roofing material; providing such an apparatus in which a sheet of vulcanized rubber is cleaned in a vat via specialized brushes with nylon bristles which incorporate abrasive silica particles to effectively clean any talc or other non-stick materials from the surface of the vulcanized rubber, thus yielding an effective bonding surface; providing such an apparatus in which the cleaned vulcanized sheet is stretched and heated; providing such an apparatus in which the heated vulcanized sheet is compressed with a polymeric film and a polyester matting to form a composite sheet; providing such an apparatus in which the composite sheet is then flipped 180 degrees; providing such an apparatus in which a mixture of roof covering granules, such as sand or ceramic beads mixed with, or coated with, a bonding agent, such as polyethylene, is distributed over the second side of the vulcanized sheet; providing such an apparatus in which the composite sheet, with the granular coating distributed thereon, is passed through a second heater which melts the polyethylene bonding agent, thus bonding the granules to the sheet to form a finished roofing product; providing such an apparatus in which a splicing table is provided with which rolls of vulcanized rubber can be spliced end to end on the fly; providing a method of making a composite roofing material which minimizes waste and reliably produces a uniform product; providing a method of making the material in which a rubber sheet is cleaned, stretched and heated and then compressed with a polymeric film and a polyester matting; providing such a method of making the material in which the compressed rubber sheet, polymeric film and polyester matting then has a granular mixture of sand or ceramic roof covering granules and polyethylene bonding agent distributed thereover on the side opposite the fleece matting; providing such a method in which the vulcanized sheet, with the granular mixture thereon, is then reheated to melt the polyethylene bonding agent, thus adhering the granules to the vulcanized sheet to form a composite roofing product; providing such a method in which the composite roofing product is cooled and rolled; providing such a method in which sheets of rubber can be spliced end to end "on the fly"; providing such a method in which a selvedge of exposed rubber is created along both underside longitudinal edges of the composite material; providing such a method in which a strip of splicing tape and or primer is optionally applied to one or both of the selvedges; and providing such a roofing material, a method of making roofing material and an apparatus for making roofing material which is economical, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIGS. 1A, 1B and 1C collectively are a schematic view of an apparatus for making a composite roofing material in accordance with the present invention.

FIG. 2 is a greatly enlarged, fragmentary, perspective view of a stretching roller embedded with carborundum and an infrared heater with portions broken away to show heating rods.

FIG. 3 is a greatly enlarged and fragmentary side elevational view of the apparatus of FIG. 1, illustrating a pair of compression pinch rollers and three separate material sheets being compressed into a single composite roofing material.

FIG. 4 is an enlarged, fragmentary side elevational view of a portion of a splicing table of FIG. 1, illustrating a splicing operation between a pair of synthetic rubber sheets with two pressure heating bars.

FIG. 5 is a fragmentary perspective view of a number of sheets of composite roofing material according to the present invention with the sheets being installed on a roof, and with edges of two adjoining sheets rolled over to illustrate respective selvedges and the placement of double sided splicing tape.

FIG. 6 is a block diagram of a control circuit for controlling the apparatus of FIG. 1.

FIG. 7 is a greatly enlarged side elevational view of one of the cutting and abrading wheels of the splicing table of FIG. 1.

FIG. 8 is a greatly enlarged, fragmentary top plan view of a portion of the apparatus of FIG. 1, illustrating a flipping roller assembly for flipping a composite sheet 180 degrees.

FIG. 9 is an enlarged, cross-sectional view of a brush cylinder for cleaning a vulcanized rubber sheet.

FIG. 10 is a greatly enlarged, fragmentary view of a brush bristle from the cylinder of FIG. 9, illustrating the construction of the bristle with imbedded abrasive particles.

FIG. 11 is an enlarged, fragmentary side elevational view of a portion of the apparatus of FIGS. 1a–1c, and illustrating a hopper distributing a granular mixture over the top of a composite sheet.

FIG. 12 is a schematic illustration of a mixing cauldron for melting polyethylene materials and agitating them to coat roof covering granules with a polyethylene coating.

FIG. 13 is an enlarged, fragmentary view of a bottom portion of a distributing hopper which is distributing coated roof covering granules over a composite sheet.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

II. Apparatus

Referring to the drawings in more detail, and particularly to FIGS. 1A, 1B and 1C, reference numeral 1 designates an apparatus for making a composite roofing material in accordance with the present invention. A splicing table 2 is also shown for splicing rolls of vulcanized rubber material together end to end, as will be explained more fully below.

The apparatus 1 includes a first reel support 3 for supporting a reel 4 of vulcanized rubber sheeting. A pair of drive rollers 5 and 6 pull a vulcanized rubber sheet 11 from the reel 4. The lateral position of the reel 4 is adjusted by a servo-mechanism 8, which is controlled by an edge position sensor 9. The sensor 9, for example, can include a pair of LED's and corresponding light sensitive sensors placed, respectively, above and below and astride the desired edge position of the vulcanized rubber sheet 11. When one sensor is blocked and one sensor is receiving light, the reel 4 is correctly positioned, but when both or neither sensor is receiving light, the servo-mechanism 8 must be adjusted one way or the other until correctly positioned. The sheet 11 is then fed into a first pair of tensioning rollers 12 and 13. The tensioning rollers 12 and 13, in cooperation with a tensioning roller 14, constrain the vulcanized rubber sheet 11 and pull it against an optional motor driven abrading roller 15. The roller 15 is shown equipped with abrading teeth 21, but an otherwise smooth roller coated with industrial diamond dust, carborundum grit or the like is suitable as well. The abrading roller 15 loosens the ordinary non-stick talc coating typically applied to synthetic rubber sheets during the vulcanization process. From the tensioning roller 14, the vulcanized rubber sheet 11 is passed through a rinsing vat 22 containing water 23 or other cleaning fluid. Within the vat 22 two pairs of counter-rotating cylindrical brushes 24 and 25 thoroughly clean the talc from both sides of the sheet 11 while removing any particles remaining from the abrading action of the roller 15.

The brushes 24 and 25 are shown in greater detail in FIGS. 9 and 10, where each cylinder includes a central hub 26 with a plurality of bristles 27 extending radially outward therefrom. The cylindrical brushes 24 and 25 can be made up of a plurality of circular brushing tools of the type disclosed in U.S. Pat. No. 5,108,155 to Frank J. Hettes et al, which is incorporated herein by reference, with the tools arrayed side by side to form a cylinder. The bristles 27, which are shown in greater detail in FIG. 10, each include a nylon filament 28 within which are imbedded a number of abrasive silica particles 29. The bristles 27 can be of the type made by the Dupont Corporation and sold under the trademark "Nylox". This particular bristle construction has been found to provide excellent cleaning results in the instant application while evidencing good wear resistance.

Tensioning rollers 31–34 pull the vulcanized sheet 11 taut against the brush cylinders 24 and 25. From the vat 22, the cleaned, vulcanized rubber sheet 11 is pulled upward into a dryer and accumulator, generally indicated at 35. The accumulator 35, which overlaps between FIG. 1A and FIG. 1B, includes a number of fixed rollers 41–45, here shown as 5 in number, and a plurality of movable rollers 51–54, here shown as 4 in number. As is conventional in such accumulators, the movable rollers 51–54 are weighted and are free to move up and down within respective slots 61–64 to hold a variable length of vulcanized rubber sheet 11. A plurality of position sensors 55a–55d are provided at the top of each slot 61–64 and a plurality of proximity switches 56a–56d to sense the positions of movable rollers 51–54 at the uppermost and lowermost positions, respectively, within their respective slots 61–64 to thereby control cycles of the abrading roller 15 and the brush cylinders 24 and 25 as well as pinch rollers 5 and 6, as will be explained below. The accumulator 35 thus acts as a buffer to store a length of the vulcanized rubber sheet 11 sufficient to compensate for speed differences before and after the accumulator 35.

From the accumulator 35, the vulcanized rubber sheet 11 is drawn downward past a preheater 65, which preheats the sheet 11, and past a stretching roller 66. The stretching roller 66 is better illustrated in FIG. 2. Referring to FIG. 2, the stretching roller 66 includes a relatively small diameter cylinder 71 about which is tightly wrapped and welded a coiled rod 72. The cylinder 71 is rotated counter-clockwise (as shown in FIG. 2) at a speed such that the outer surface of the coiled rod 72 spins faster than the rate at which the vulcanized rubber sheet 11 is advancing. This causes the sheet 11 to be stretched in width as it passes the roller 66. Still referring to FIG. 2, two opposed pairs of edge steering rollers 73, of which only one is illustrated, act to smooth the edges of and steer the sheet 11 as it exits the stretching roller 66.

From the edge rollers 73, the sheet 11 passes through a pair of guide rollers 74 and beneath an infrared heater 75. Again referring to FIG. 2, the heater 75 can include a plurality of resistive rods 81 which are heated by the application of an electrical current. While only one heater 75 is shown, it should be noted that multiple ones of these heaters can be positioned both above and below the sheet 11 to increase the heating efficiency of the apparatus 1. For the best results it has been determined that the vulcanized rubber sheet 11 must be heated to a surface temperature range of 275-350 degrees Fahrenheit, depending upon what adhesive media is used.

Referring to FIGS. 1B and 3, the vulcanized rubber sheet 11, upon leaving the heater 75, is drawn past a temperature sensor 82, and then through a pair of compression pinch rollers 83 and 84, of which one or both rollers 83 and 84 may be driven. The temperature sensor 82 is used to control the speed of the compression pinch roller 84, as will be explained below. At this point, the abraded side of the vulcanized rubber sheet 11 is compressed by the rollers 83 and 84 along with a continuous length of thin polymer film 91 extending from a reel 92 and a continuous sheet of fleece-like polyester matting 93 extending from a reel 94 to yield an intermediate sheet of composite roofing material 95. The polymer film can be polyethylene and can be produced from recycled materials. Preferably both the polyethylene film 91 and the matting 93 are somewhat narrower than the vulcanized rubber sheet 11, thus leaving an exposed selvedge 101 and 102, respectively (FIG. 5), on the underside of either longitudinal edge of the composite sheet 95. In order to begin cooling the composite roofing sheet 95, as well as to control the temperature of the pinch rollers 83 and 84, heating and cooling water is circulated through the pinch rollers 83 and 84 via respective supply pipes 96 and 97 and opposite drain pipes (not shown). Although the preferred embodiment is illustrated as using the thin polymer film 91 to perform essentially as a hot melt adhesive, it should be emphasized that, instead of a film 91, an extruded hot melt adhesive (not shown) can be applied to the cleaned, heated rubber sheet 11 which can then be compressed with the matting 93 to form the roofing material 95.

From the compression pinch rollers 83 and 84, the composite roofing sheet 95 is pulled beneath a pair of edge sensors 105, only one of which is shown. The edge sensors 105 detect the edges of the sheet 95 to provide accurate steering data. The sheet 95 is then drawn through a flipping roller assembly 111 such that the sheet 95 is flipped 180 degrees to expose a side of the vulcanized sheet 11 which is opposite the fleece matting 93.

The flipping roller assembly 111, which is illustrated in greater detail in FIG. 8, includes a first roller 112 angled at an approximately 45 degree angle from the sheet path, which is positioned just above the sheet 95 as it passes the edge sensor 105 (FIG. 1b). The sheet 95 is then passed over the roller 112 and then around a roller 113 which is directed at approximately a 45 degree angle with respect to the roller 112 and is also angled upward from right to left such that the sheet 95 is shifted to the left. From the roller 113, the sheet 95 passes around a roller 114 which is placed at approximately a right angle with respect to the roller 112. From the roller 114, the sheet 95 advances to the right, having been flipped 180 degrees by the action of the flipping roller assembly 111. The side of the sheet 95 which is opposite to the fleece matting 93, i.e. the uncovered side of the rubber sheet 11, is thus directed upward.

From the flipping roller assembly 111, the sheet 95 advances beneath a series of hoppers 121–123 supported by a rack 124. Each of the hoppers 121–123 extends substantially across the entire width of the sheet 95, with the exception of top selvedge portions on one or both sides thereof, and each hopper 121–123 includes a bottom slit 125 (FIG. 11) which can be selectively opened such that a granular mixture 126 is dropped onto the top of the sheet 95. The mixture 125 includes, as an example, roof covering sand or ceramic granules 131 mixed with particles of polyethylene, or a similar bonding material 132. The three hoppers 121–123 can each contain the same granular mixture such that two or more of the hoppers 121–123 can be opened simultaneously for more complete coverage. Alternatively, the hoppers 121–123 can each contain a granular mixture with respective differently colored ceramic beads 131, for example, so that the color of the mixture, and thus the color of the upper portion of the composite roofing sheet, as will be explained subsequently, can be changed on the fly. The ceramic beads 131 can include, for example, a product known as Colorquartz Aggregate, which are ceramic beads of various colors designed for flooring applications and produced and sold by the 3M Company. The particles of polyethylene 132 can be produced from recycled materials. As an alternative, the roof covering granules 131 can be coated with a coating of polyethylene by heating them in an agitating container 133 (FIG. 12) together with a quantity of polyethylene materials 134. By heating the mixture of granules 131 and polyethylene materials 134 to a temperature in excess of the melting point of polyethylene, i.e. approximately 350 degrees Farenheit, while agitating the mixture, the polyethylene materials 134 will melt, thus coating the granules 131 with a coating of polyethylene. By using the latter technique, the polyethylene materials 134 can be shredded recycled beverage containers or the like, which are much more economical than particulate polyethylene material 132. Once the polyethylene materials 134 are melted in the container 133, and the granules 131 are coated to yield coated granules 135, these polyethylene coated granules 135 can then be dropped onto the sheet 95 from the hoppers 121–123 (FIG. 13). The hoppers 121–123 can also themselves be heated such that the coated granules 135 are raised to a temperature near 350 degrees Farenheit before they are dropped onto the sheet 95.

From the hoppers 121–123, the sheet 95, with the granular mixture 125 coating the top surface, is passed beneath a second heater 136 (FIGS. 1b and 1c). The heater 136, which can be an infrared heater of similar construction as the heater 75, thus heats the top surface of the sheet 95 and the granular mixture 125 to a temperature in the range of 250-350 degrees Fahrenheit. This has the effect of melting the polyethylene particles 132, (or the polyethylene coating on the granules 135) which thus form a bonding agent to adhere the granule 131 to the top surface of the sheet 95. The sheet 95 thus acquires a granular surface layer 140 to yield a finished composite roofing sheet 141. In a preferred embodiment, the sand or ceramic granules 131 of the granular surface 140 are white or otherwise lightly colored so that they exhibit excellent heat reflective properties when installed on a roof.

From the heater 136, the composite roofing sheet 141 passes past a length sensor 142, past an idler roller 143, and a tension roller 144 with a primer applicator 145 positioned therebetween. The primer applicator 145 optionally applies a layer of primer to one or both of a pair of selvedges 101 and 102 on the underneath side of the composite roofing sheet 141 (FIG. 5). The composite sheet 141 is then passed through a second, smaller accumulator 151 and then past a pair of variable speed exit pinch rollers 152 and 153 where it is loaded onto a motor driven reel 154. Within the accumulator 151, a pair of position sensing proximity switches 155 and 156 are positioned within a pair of slots 161 to sense the position of a respective pair of movable rollers 162 and 163. These switches 155 and 156 control the exit pinch rollers 152 and 153, as explained below. At this point a double-sided splicing tape 164 is optionally applied from a tape reel 165 to at least the selvedge 101 (FIG. 5). The sheet 141 at this point still retains considerable heat, which facilitates the adherence of the tape 164 to the sheet 141. The tape 164 preferably has a peelable non-stick covering over the exposed upper side. A primer applied by the applicator 145 can facilitate the adherence of the tape 164 to the sheet 141. A length measurement sensor 171 is located just ahead of the pinch rollers 152 and 153 to measure the length of the roofing sheet 141 and to control a cutter 172 to create rolls of a particular length.

The composite sheet 141 is shown in a closer approximation to scale in FIG. 11. Typical thicknesses for the vulcanized rubber sheet 11 range from 30 to 80 mils, for the polymer film 91 from 1 to 5 mils, and for the polyester matting 93 from 30 to 80 mils. The thickness of the granular coating 140 is typically also in the range of 30 to 100 mils. A successful production run has been made with a EPDM rubber sheet 11 of between 45 and 60 mils, a polyethylene film 91 of 1.5 mils a polyester matting 93 of 55 mils with a granular coating 140 of approximately 50 mils.

III. Splicing Table

Referring to FIGS. 1A, 4 and 7, a portion of the splicing table 2 is shown in greater detail, with a reel 180 from which a second synthetic vulcanized rubber sheet 181 is drawn, being spliced end to end with the first sheet 11. The sheet 181 is trimmed and abraded by a top edge trimmer and abrading wheel 182 while the sheet 11 is trimmed and abraded by a bottom edge trimmer and abrading wheel 183. The trimmer and abrading wheels 182 and 183 are identical and thus only the upper trimmer 182 is illustrated in detail in FIG. 7. The trimmer 182 includes a motor 182a which drives both an abrading wheel 182b and a cutter wheel 182c. The trimmer 182 can be selectively lowered into place and moved along the end of the sheet 181 to both uniformly trim the sheet end via the cutting wheel 182c and abrade the surface of the sheet 181 to remove any talc therefrom and prepare the surface for adhesion of a length of heat sensitive double-sided splicing tape 184. The tape strip 184 is inserted between the overlapping edges of the sheets 181 and 11. A top heating and compression bar 185 is lowered into contact with the overlapped edges by a press 186, with the top bar 185 urging the overlapped edges into contact with a bottom heating and compression bar 187 and press 188. The bars 185 and 187 heat the splice to a temperature at which the tape 184 will successfully adhere to both sheets 181 and 11 while simultaneously applying pressure to yield an even splice. Referring to FIG. 1A, with the splicing table 2 positioned in front of the apparatus 1, the reel 4 can be spliced together with the reel 180 "on the fly", i.e. as the apparatus 1 continues to make composite roofing material, to avoid shutting down production as the reel 4 is used up. A hinged extension 189 of a reel track 190 can be lowered to allow the reel 180 to be easily moved over the splice table 2 and onto the reel support 3 of the apparatus 1.

IV. Control Circuit

Referring to FIGS. 1B and 6, a control panel 191 includes a Programmable Logic Controller or PLC 192. The PLC 192 is connected to various sensors, including the temperature sensor 82, the accumulator position sensors 55a–d, 56 a–d, 155 and 156, and the edge sensors 9 and 142. In response to the temperature sensor 82, the PLC 192 controls the speed of compression pinch roller 84 to thereby control the duration of time that a given segment of the sheet 11 remains in proximity to the heater 75. The PLC 192 is responsive to the edge sensor 9 to control the position of servo-mechanism 8 to thereby control the lateral position of reel 4. The PLC 192 is also responsive to the accumulator position sensors 55a–d and 56a–d, as well as the accumulator position sensors 155 and 156, which can be proximity switches logically combined by the PLC 192, as shown in block 193.

Referring to block 193, the top switches 55a–55c are logically ANDed together by the PLC 192 to provide a combined feed output signal when all three are ON which causes the PLC 192 to start the abrading roller 15 and brush cylinders 24 and 25 and associated drive rollers to thereby feed more of the vulcanized rubber sheet 11 to the accumulator 35. The switch 55d is separately monitored for an emergency stop signal which shuts off the entire apparatus 1 should the accumulator 35 become totally empty. Similarly, the bottom four switches 56a–56d are ANDed together to provide an accumulator full output signal when all four are ON which causes the PLC 192 to temporarily stop the abrading roller 15 and brush cylinders 24 and 25 and associated drive rollers. The two proximity switches 155 and 156 in the accumulator 151 are monitored by the PLC 192 which is responsive to both switches being ON to start the exit pinch rollers 152 and 153. The PLC 192 continues to drive the pinch rollers 152 and 153 until both switches 155 and 156 are OFF. The PLC 192 is also connected to the splice table 2 to control the trimmer and abraders 182 and 183, the splicing heater bars 185 and 187 and the presses 186 and 188, and to a plurality of gauges and indicators 195. Finally, the PLC 192 is connected to the second infrared heater 136 and to the distributing hoppers 121–123 to control the distribution of and the heating of the granular coating 140 on the sheet 141.

V. Composite Roofing Material

A number of sheets 201–204 of the composite roofing material 95 made by the apparatus of FIGS. 1–4 and 6–13 are illustrated in FIG. 5 being applied to a roof. Each sheet 201–204 includes 2 selvedges 101 and 102 which extend longitudinally along the underside edges of each sheet. The selvedge 101 includes a strip of the double-edged splicing tape 164 applied thereto, as described above. As shown in FIG. 5, when the sheets 201 and 202 are being applied to a roof, for example via an adhesive as taught in the '812 patent, the selvedge 101 of sheet 201, with the tape strip 164 is overlayed over the selvedge 102 of adjacent sheet 202. Above the selvedge 102 on the sheet 202, i.e. on the opposite side of the sheet 102, a selvedge 203 is left with no granular coating 140 thereon. Given relative thicknesses of vulcanized rubber sheet 11 and polyester matting 93 similar to those earlier described, e.g. 45 mils to 55 mils, respectively, a seam between adjacent sheets 201 and 202 which incorporates tape of a thickness less than 40 mils would lie approximately flat on the roof surface, thus greatly speeding up the application process and avoiding many of the non weather-tight seam problems of prior art applications.

While the apparatus 1 has been illustrated with a specific arrangement of reels, drive rollers, abrading roller, accumulator, heater, etc., it should be noted that many alternative arrangements could produce composite roofing materials of the type contemplated. In addition, the PLC controller 192 can control other variables such as heat output in addition to compression roller speed to vary heat application. It is thus to be understood that while certain forms of the present invention have been illustrated and described herein, it is not to be so limited.

What is claimed and desired to be secured by Letters Patent is as follows:

1. Apparatus for making a composite roofing material comprising:

a distributing means for distributing a mixture of a bonding agent and roof covering granules over a side of a vulcanized sheet;

a heater adapted to heat said side of said sheet with said granular mixture thereon to cause said bonding agent to melt and bond said roof covering granules to said rubber sheet; and propulsion means for advancing said vulcanized sheet through a path which includes said first heater, said compressing means, said distributing means and said second heater.

2. Apparatus as in claim 1, wherein said distributing means distributes a mixture of roof covering granules with particulate polyethylene as said bonding agent.

3. Apparatus as in claim 2, wherein said roof covering granules comprise sand.

4. Apparatus as in claim 2, wherein said roof covering granules comprise ceramic granules.

5. Apparatus as in claim 2, wherein said distributing means comprises a plurality of hoppers suspended above the path of said rubber sheet with each said hopper including a controllable discharge outlet.

6. Apparatus as in claim 5, wherein each of said hoppers contains roof covering granules of a different color such that the color of the composite roofing material can be changed by controlling which hopper or hoppers is open.

7. Apparatus for cleaning talc or other non-stick coatings from a vulcanized rubber sheet, comprising:

(a) a vat containing a cleaning solution;

(b) at least one pair of cylindrical brushes in juxtaposition with each other in said vat, said brushes having a longitudinal length at least as great as the width of said rubber sheet, at least one of said brushes including a plurality of brush bristles arrayed along the length thereof, at least some of said bristles being constructed of a synthetic material filament with abrasive particles embedded therein;

(c) driving means for driving said cylindrical brushes in counter-rotating directions;

(d) apparatus adapted to tension said rubber sheet as it is driven between said cylindrical brushes; and (e) propelling means for propelling said rubber sheet through said vat and between said counter-rotating brushes.

8. Apparatus as in claim 7, wherein said bristle filaments comprise nylon.

9. Apparatus as in claim 7, wherein said abrasive particles in said bristles comprise silica.

\* \* \* \* \*